(12) United States Patent
Yoo et al.

(10) Patent No.: US 7,352,954 B2
(45) Date of Patent: Apr. 1, 2008

(54) APPARATUS AND METHOD FOR DISPLAYING ON-SCREEN DISPLAY IMAGE IN COMPOUND VIDEO DEVICE

(75) Inventors: Seung Ho Yoo, Yongin-si (KR); Seong Do Gim, Pyungtaek-si (KR)

(73) Assignee: LG Electronics Inc., Seoul (KR)

(*) Notice: Subject to any disclaimer, the term of this patent is extended or adjusted under 35 U.S.C. 154(b) by 783 days.

(21) Appl. No.: 10/781,847

(22) Filed: Feb. 20, 2004

(65) Prior Publication Data

US 2004/0184786 A1 Sep. 23, 2004

(30) Foreign Application Priority Data

Feb. 21, 2003 (KR) .................. 10-2003-0010908
Mar. 5, 2003 (KR) .................. 10-2003-0013802

(51) Int. Cl.
*H04N 5/91* (2006.01)

(52) U.S. Cl. ........................ 386/46; 386/125

(58) Field of Classification Search ............... 386/12, 386/46, 94, 125, 126; 348/567, 569, 589
See application file for complete search history.

(56) References Cited

U.S. PATENT DOCUMENTS 5,307,171 A * 4/1994 Azuma et al. ............. 386/131
7,136,569 B2 * 11/2006 Cho ............................. 386/46

* cited by examiner

*Primary Examiner*—Thai Q. Tran
*Assistant Examiner*—Mishawn Dunn
(74) *Attorney, Agent, or Firm*—Ked & Associates, LLP (57) ABSTRACT

An apparatus and method for displaying an on-screen display (OSD) image in a compound video device which includes a first video device, such as a video cassette recorder (VCR), and a second video device, such as a digital versatile disc (DVD) player/recorder, integrally formed with each other. Data necessary for OSD image output are separately stored in one flash memory, and any one of the data separately stored in the flash memory is selectively read and used in a corresponding one of first and second video device operation modes. Therefore, the compound video device can be significantly simplified in construction. Further, new data for OSD image output can be updated/stored in the flash memory, or be simply replaced for existing ones.

21 Claims, 7 Drawing Sheets

APPARATUS AND METHOD FOR DISPLAYING ON-SCREEN DISPLAY IMAGE IN COMPOUND VIDEO DEVICE

BACKGROUND OF THE INVENTION

1. Field of the Invention

The present invention relates to a compound video device including a first video device, such as a video cassette recorder (VCR), and a second video device, such as a digital versatile disc (DVD) player and recorder, integrally formed with each other, and more particularly to an apparatus and method for displaying an on-screen display (OSD) image in a compound video device.

2. Background of the Related Art

Recently, a compound video device including a first video device, such as a VCR, and a second video device, such as a DVD player, integrally formed with each other, has been developed and introduced to the market and has been commercially available. In addition, some devices include a VCR and a DVD player/recorder. Generally, the VCR functions to reproduce/output video and audio signals recorded on a video tape, or to record video and audio signals thereon. The DVD player functions to read/reproduce video and audio data from a DVD, which is a high-density optical disc. Some devices may also include the ability to record information to a DVD.

Figure 1:
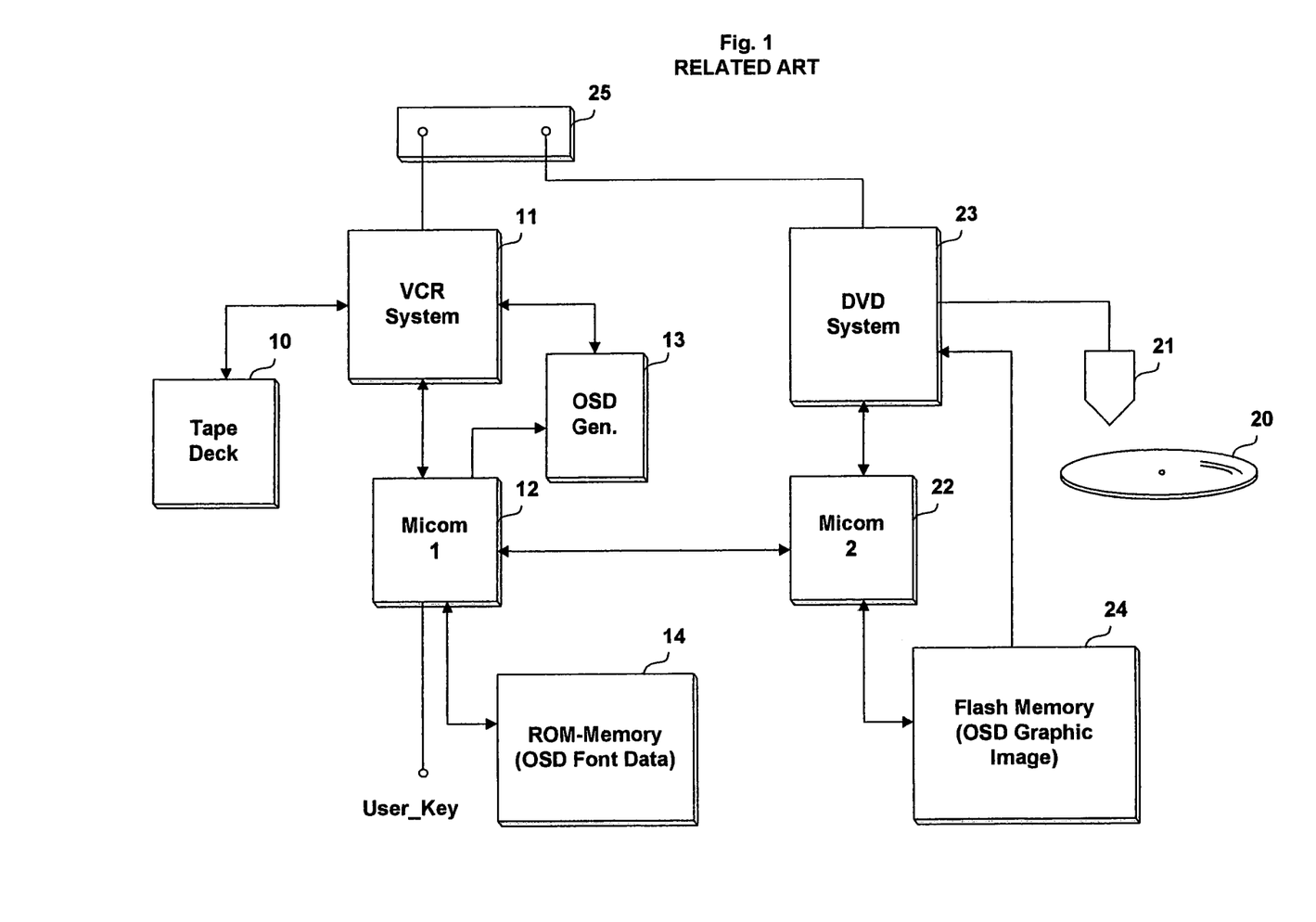
FIG. 1 is a block diagram showing the construction of a related art compound video device.

Generally, the above-mentioned compound video device comprises, as shown in FIG. 1, a VCR part including a tape mechanism (for example, a tape deck) 10, a VCR system 11, a first microcomputer 12, an OSD generator 13 and a read only memory (ROM) 14. The DVD player part includes an optical disc playing portion 20, an optical pickup 21, a second microcomputer 22, the DVD system 23 and a flash memory 24.

The compound video device further comprises an output unit 25 for outputting signals read/reproduced respectively by the VCR part and DVD player part to an external connection device such as a television. The ROM 14 stores OSD font data necessary for OSD image display in a VCR operation mode, and the flash memory 24 stores an OSD graphic image necessary for OSD image display in a DVD player operation mode.

The first microcomputer 12 sets the current operation mode of the compound video device to the VCR operation mode in response to a user's key input to perform a corresponding operation. If an OSD image display in the VCR operation mode is required, the first microcomputer 12 reads the OSD font data stored in the ROM 14 and controls the OSD generator 13 such that a corresponding OSD image is outputted and displayed.

The second microcomputer 22 receives the user's key input via the first microcomputer 12 and can set the current operation mode of the compound video device to the DVD player operation mode in response to the received key input. When an OSD image display in the DVD player operation mode is required, the second microcomputer 22 reads the OSD graphic image stored in the flash memory 24, and controls the DVD system 23 such that a corresponding OSD image is outputted and displayed.

As a result, the user can view the OSD image outputted/displayed in the VCR operation mode or the OSD image outputted/displayed in the DVD player operation mode through the screen of the television connected with the compound video device. The user is further capable of simply and conveniently selecting a desired function or operation through the displayed OSD image.

However, the above-mentioned compound video device has a disadvantage in that it needs both the ROM 14 and flash memory 24. The OSD font data required in the VCR operation mode is stored in the ROM 14, and the OSD graphic image required in the DVD player operation mode is stored in the flash memory 24. As a result, it is difficult to simplify the device's construction. Further, if it becomes necessary to change or update the OSD image data used in the VCR mode, it is necessary to replace the ROM installed in the device with a new one.

SUMMARY OF THE INVENTION

An object of the invention is to solve at least the above problems and/or disadvantages and to provide at least the advantages described hereinafter.

Therefore, the present invention has been made in view of the above problems, and it is an object of the present invention to provide an apparatus and method for displaying an OSD image in a compound video device, wherein an OSD graphic image and OSD font data necessary for OSD image output are separately stored in one flash memory. In this system, any of the OSD font data and OSD graphic image separately stored in the flash memory may be selectively read and used in a corresponding one of first and second video device operation modes.

It is another object of the present invention to provide an apparatus and method for displaying an OSD image in a compound video device, wherein OSD graphic images corresponding, respectively, to first and second video devices are separately stored in one flash memory, and any one of the OSD graphic images separately stored in the flash memory is selectively read and used in a corresponding one of first and second video device operation modes.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 2:
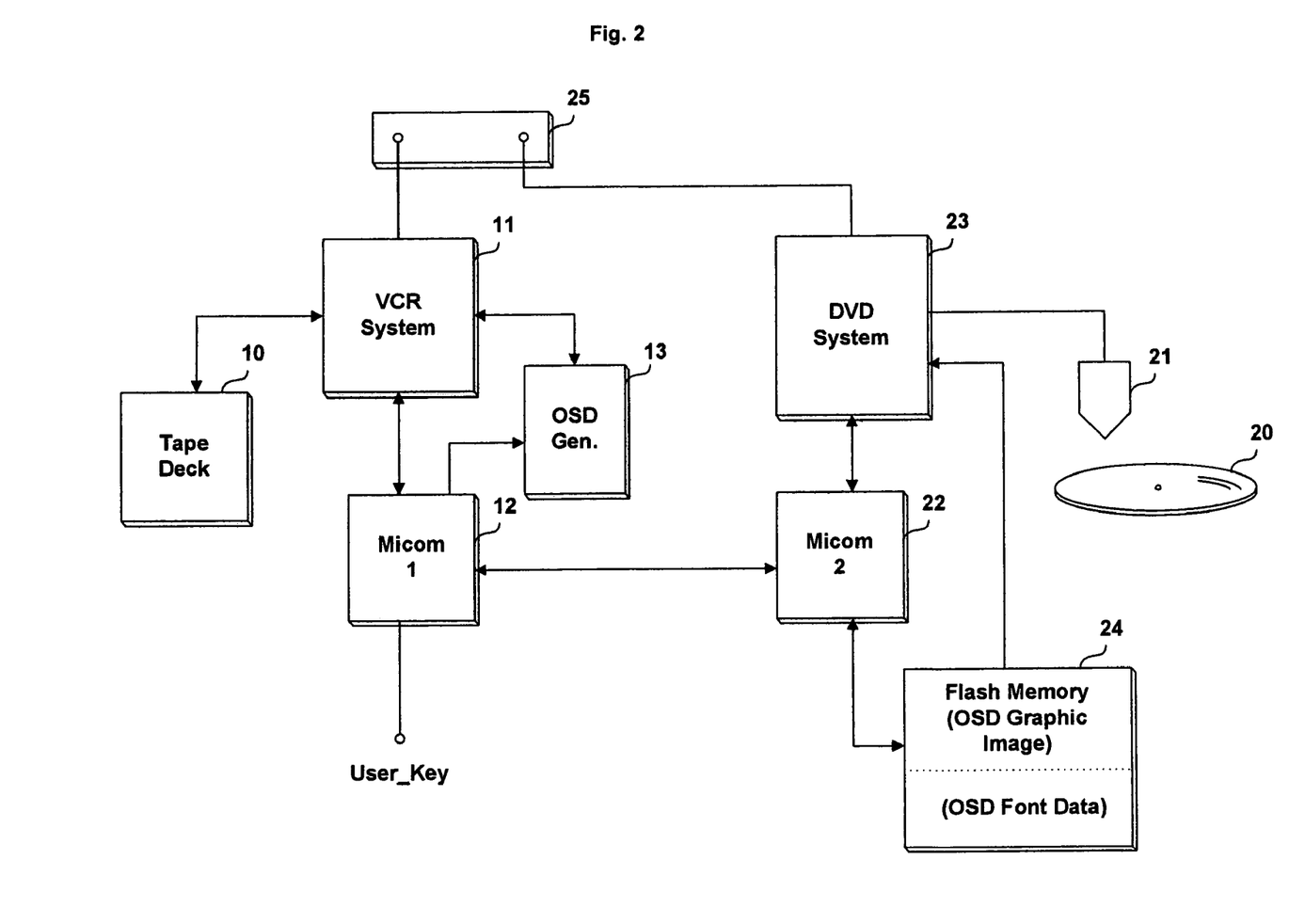
FIG. 2 is a block diagram showing the construction of a compound video device to which an OSD image display apparatus and method according to a first embodiment of the present invention are applied.

With reference to FIG. 2, there is shown in block form the construction of a compound video device to which an OSD image display apparatus and method according to a first embodiment of the present invention are applied. As shown in this drawing, the compound video device comprises a VCR part including a tape mechanism 10, a VCR system 11, a first microcomputer 12 and an OSD generator 13. The device further includes a DVD player part including an optical disc portion 20, an optical pickup 21, a second microcomputer 22, a DVD system 23 and a flash memory 24. In the description which follows, the DVD system will primarily be described as a DVD player. However, in some embodiments of the invention, the DVD system may include both playing and recording capabilities.

The compound video device further comprises an output unit 25 for outputting signals read/reproduced respectively by the VCR part and DVD player part to an external connection device such as a television. The flash memory 24 separately stores OSD graphic image necessary for an OSD image display in a DVD player operation mode and OSD font data necessary for an OSD image display in a VCR operation mode.

Figure 3:
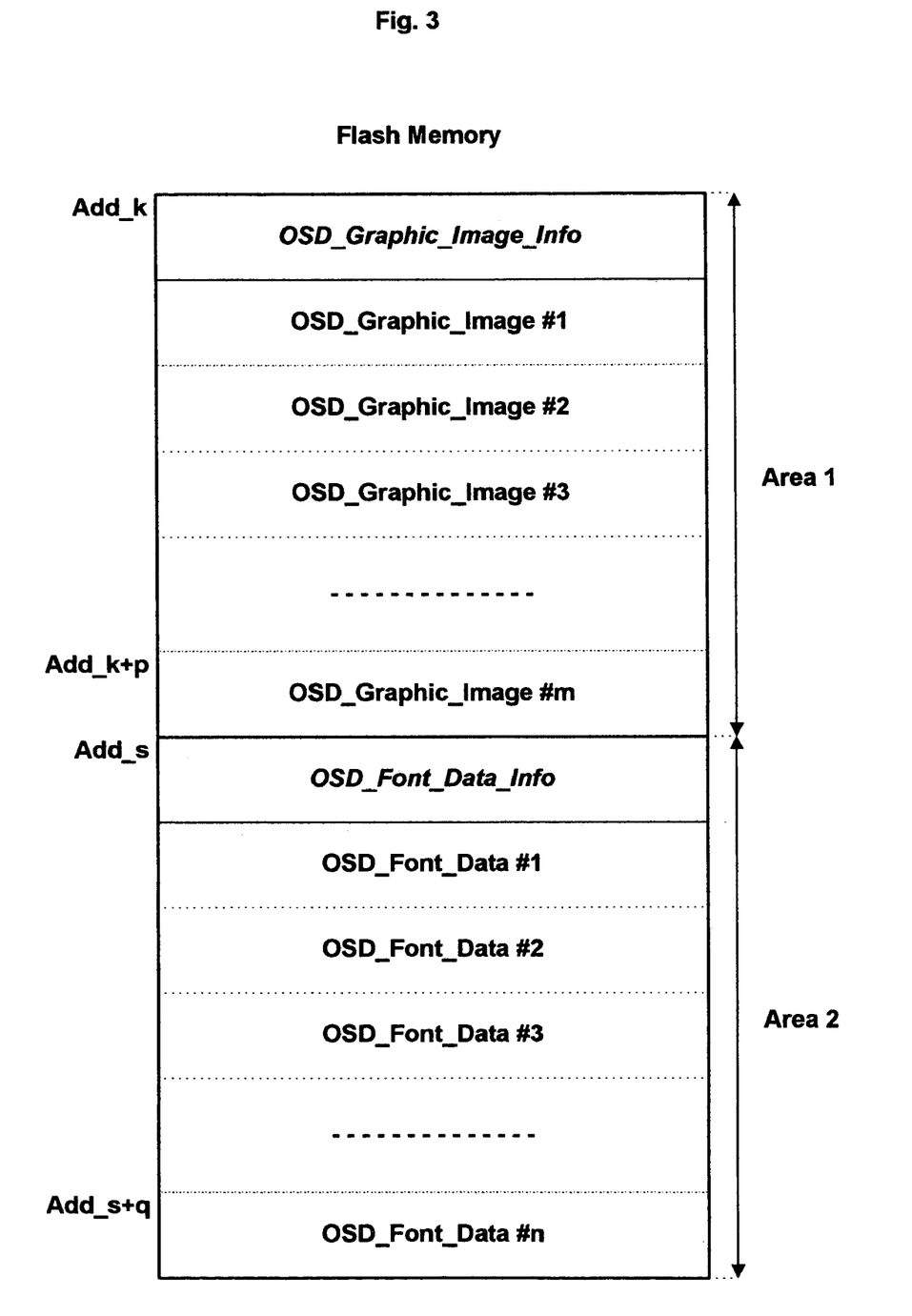
FIG. 3 is a view showing OSD graphic image data and OSD font data separately stored in a flash memory of the compound video device according to the first embodiment of the present invention.

The flash memory 24 is preferably partitioned into two areas, a first area Area 1 and a second area Area 2, as shown in FIG. 3. Area 1 includes a plurality of memory locations Add_k–Add_k+p for storing a plurality of OSD graphic images OSD_Graphic_Image#1-OSD_Graphic_Image#m.

Also, OSD graphic image information OSD_Graphic_Image_Info is stored in Area 1. The OSD graphic image information contains information regarding the number of the OSD graphic images (Nunber_of_OSD_Graphic_Image), information regarding a write start address of the OSD graphic images (Start_Address_OSD_Graphic_Image), and information regarding the size of the OSD graphic images (Size of OSD Graphic_Image).

Area 2 includes a plurality of memory locations Add_s–Add_s+q for storing a plurality of OSD font data (OSD_Font_Data#1-OSD_Font_Data#n), as well as OSD font data information (OSD_Font_Data_Info). The OSD font data information contains information regarding the number of the OSD font data (Number of_OSD_Font_Data), information regarding a write start address of the OSD font data (Start_Address_OSD_Font_Data), and information regarding the size of the OSD font data (Size_of OSD_Font_Data).

The first microcomputer 12 sets the current operation mode of the compound video device to the VCR operation mode in response to a user's key input to perform a corresponding operation, as stated previously. If an OSD image display in the VCR operation mode is required, the first microcomputer 12 requests and receives a desired one of the OSD font data stored in the second area of the flash memory 24 via an interface with the second microcomputer 22, and controls the OSD generator 13 such that a corresponding OSD image is outputted and displayed.

The second microcomputer 22 receives the user's key input via the first microcomputer 12 and sets the current operation mode of the compound video device to the DVD player operation mode in response to the received key input to perform a corresponding operation. Where an OSD image display in the DVD player operation mode is required, the second microcomputer 22 reads a desired one of the OSD graphic images stored in the first area of the flash memory 24, and controls the DVD system 23 such that a corresponding OSD image is outputted and displayed, as will hereinafter be described in detail.

Figure 4:
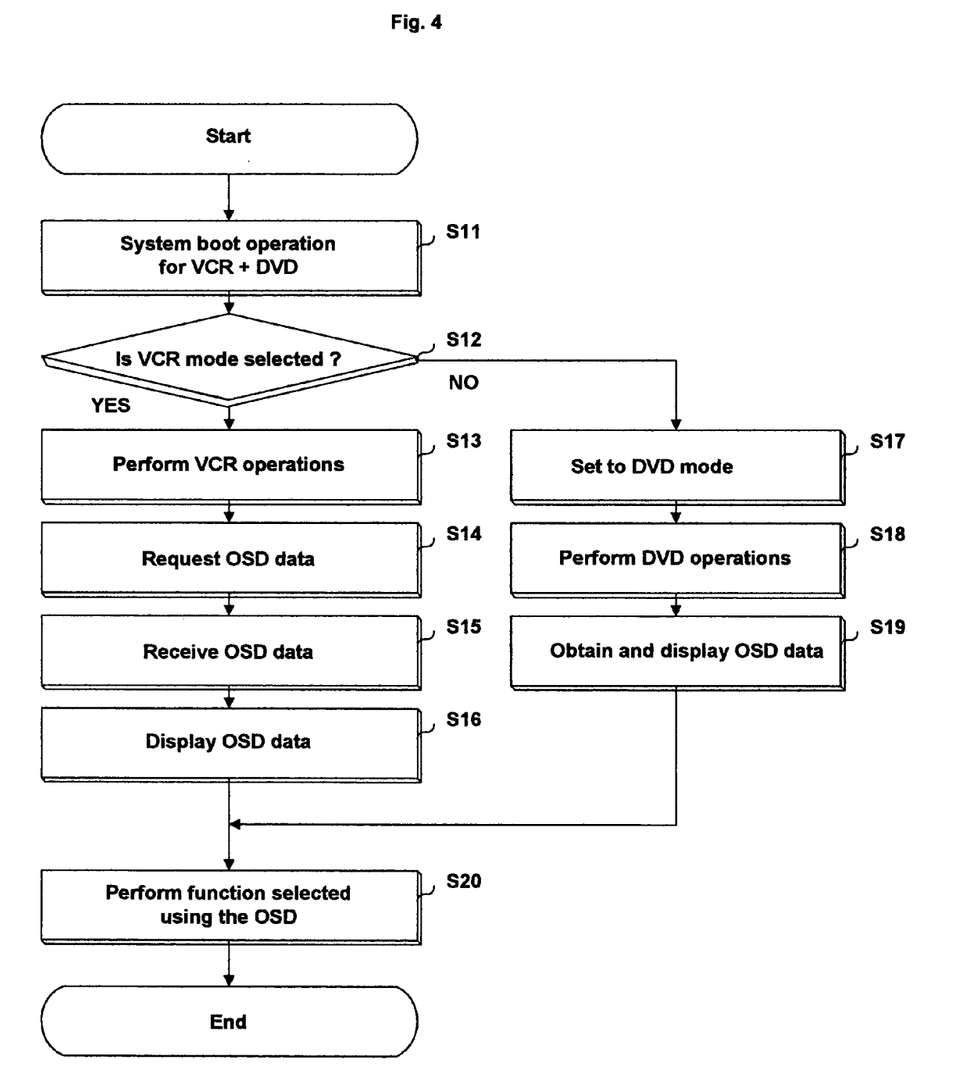
FIG. 4 is a flow chart illustrating an OSD image display method according to an embodiment of the present invention.

FIG. 4 is a flow chart illustrating the OSD image display method according to the first embodiment of the present invention. First, if the user turns on system power of the compound video device, then the first microcomputer 12 performs a system booting operation for control of the respective components corresponding to the VCR part and the second microcomputer 22 performs a system booting operation for control of the respective components corresponding to the DVD player part (S11).

Thereafter, the first microcomputer 12 sets the current operation mode of the compound video device to the VCR operation mode in response to a key input from the user, or transfers the key input to the second microcomputer 22 so that the microcomputer 22 can set the current operation mode to the DVD player operation mode. For example, in the case where the current operation mode of the compound video device is set to the VCR operation mode (S12), the first microcomputer 12 controls the VCR system 11 in response to the user's request to drive the tape mechanism 10.

Subsequently, the first microcomputer 12 performs a reproduction operation of reading/reproducing video and audio signals from a video tape (not shown) loaded in the tape mechanism 10, or a recording operation of recording video and audio signals on the video tape (S13). At this time, the first microcomputer 12 generates a command for requesting the second microcomputer 22 to read/transfer OSD font data for output/display of an OSD image necessary for the reproduction operation or recording operation, and transfers the generated command to the second microcomputer 22 (S14).

In response to the command from the first microcomputer 12 transferred through the above procedure, the second microcomputer 22 reads the OSD font data separately stored in Area 2 of the flash memory 24 and transfers the read OSD font data to the first microcomputer 12 (S15).

The first microcomputer 12 receives the OSD font data transferred from the second microcomputer 22 and controls the OSD generator 13 to perform a series of operations of outputting/displaying the OSD image necessary for the reproduction operation or recording operation in the VCR part (S16). Thereafter, in the case where the user selects and requests a desired operation or function using the OSD image outputted/displayed in the above manner, the first microcomputer 12 performs the corresponding operation or function (S20).

On the other hand, in the case where the current operation mode of the compound video device is set to the DVD player operation mode in response to the user's key input (S17), the second microcomputer 22 controls the DVD system 23 to perform a DVD reproduction operation of reading/reproducing video and audio data recorded on an optical disc, for example, a DVD loaded in the optical disk portion 20 (S18).

For output/display of an OSD image necessary for the DVD reproduction operation, the second microcomputer 22 reads an associated one of the OSD graphic images separately stored in Area 1 of the flash memory 24, outputs the read OSD graphic image to the DVD system 23 and controls the DVD system 23 to perform a series of operations of outputting/displaying the OSD image necessary for the reproduction operation in the DVD player part (S19). Thereafter, when the user selects and requests a desired operation or function using the OSD image outputted/displayed in the above manner, the second microcomputer 22 performs the corresponding operation or function (S20).

Figure 5:
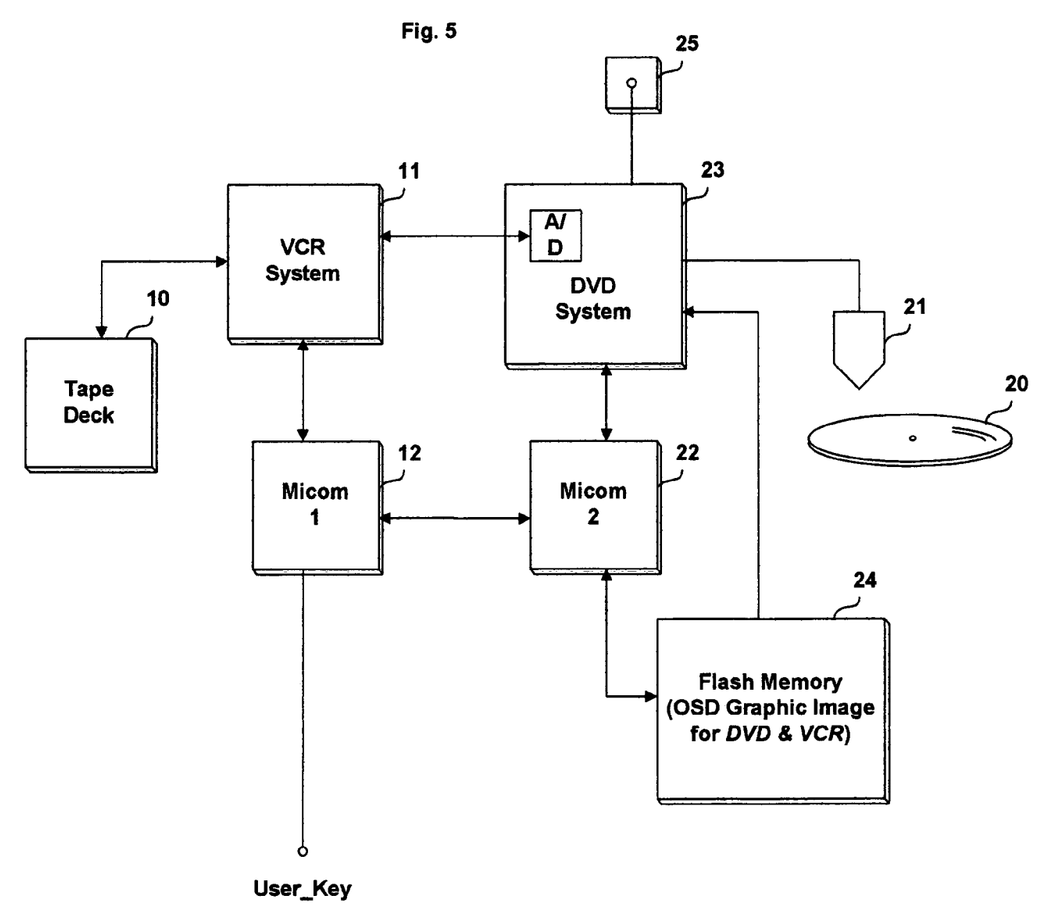
FIG. 5 is a block diagram showing the construction of a compound video device to which an OSD image display apparatus and method according to a second embodiment of the present invention are applied.

FIG. 5 is a block diagram showing the construction of a compound video device to which an OSD image display apparatus and method according to a second embodiment of the present invention are applied. As shown in this drawing, the compound video device comprises a VCR part including a tape mechanism 10, a VCR system 11 and a first microcomputer 12. The DVD player part includes an optical disc portion 20, an optical pickup 21, a second microcomputer 22, a DVD system 23 and a flash memory 24.

In this embodiment, an analog signal reproduced by the VCR system 11 is analog-to-digital (A/D) converted by an A/D converter (not denoted by a reference numeral) in the DVD system 23. The signal is subjected to a digital signal process, and is then output through an output unit 25, which is connected to an external connection device such as a television. The flash memory 24 separately stores an OSD graphic image (referred to hereinafter as an OSD graphic image for a DVD) necessary for OSD image display in a DVD player operation mode and an OSD graphic image (referred to hereinafter as an OSD graphic image for a VCR) necessary for OSD image display in a VCR operation mode.

Figure 6:
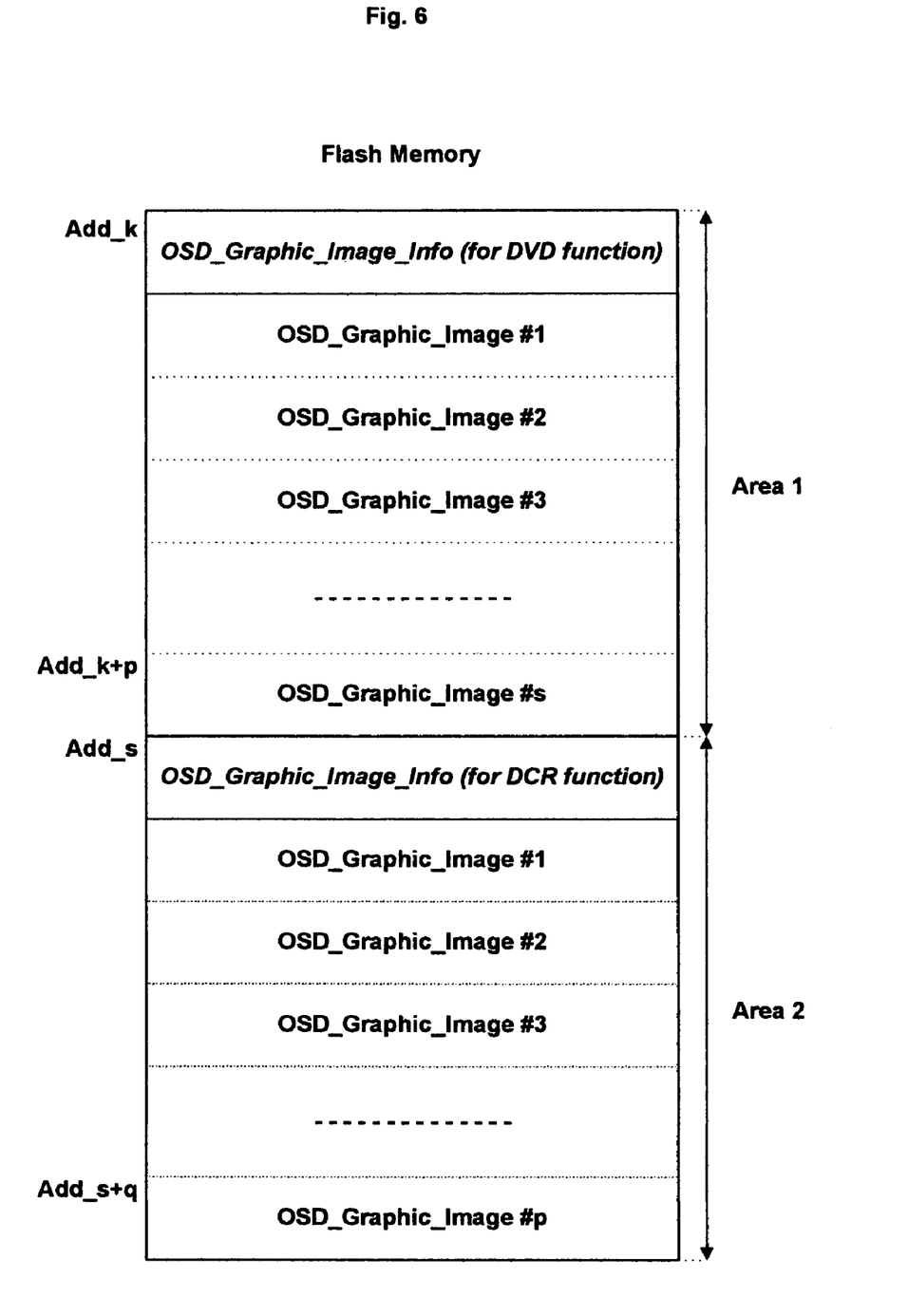
FIG. 6 is a view showing OSD graphic images corresponding, respectively, to first and second video devices separately stored in a flash memory of the compound video device according to the second embodiment of the present invention.

The flash memory 24 is preferably partitioned into a first area Area 1 and a second area Area 2, as shown in FIG. 6. Area 1 includes a plurality of memory locations Add_k–Add_k+p for storing a plurality of OSD graphic images for the DVD OSD_Graphic_Image#1–OSD_Graphic_Image#s. OSD graphic image information for the DVD (OSD_Graphic_Image_Info) is also stored in Area 1.

Area 2 includes a plurality of memory locations Add_s–Add_s+q for storing a plurality of OSD graphic images for the VCR OSD_Graphic_Image#1–OSD_Graphic_Image#p. OSD graphic image information for the VCR OSD_Graphic_Image_Info is also stored in Area 2.

The OSD graphic image information for the DVD and the OSD graphic image information for the VCR each contain information regarding the number of the OSD graphic images (Number_of_OSD_Graphic_Image), information regarding a write start address of the OSD graphic images (Start_Address_OSD_Graphic_Image), and information regarding the size of the OSD graphic images (Size_of_OSD_Graphic_Image).

The first microcomputer 12 sets the current operation mode of the compound video device to the VCR operation mode in response to a user's key input to perform a corresponding operation, as stated previously. If an OSD image display in the VCR operation mode is required, the first microcomputer 12 performs an interface with the second microcomputer 22. The second microcomputer 22 selects and reads a desired one of the OSD graphic images for the VCR stored in the second area of the flash memory 24, and controls the DVD system 23 to perform a series of operations of overlapping/outputting the read OSD graphic image for the VCR, A/D-converting an analog signal reproduced by the VCR system 11, and carrying out the digital signal process with respect to the A/D-converted signal.

On the other hand, the second microcomputer 22 sets the current operation mode of the compound video device to the DVD player operation mode in response to the user's key input received via the first microcomputer 12 to perform a corresponding operation. When an OSD image display in the DVD player operation mode is required, the second microcomputer 22 reads a desired one of the OSD graphic images for the DVD stored in the first area of the flash memory 24 and controls the DVD system 23 such that a corresponding OSD image is outputted and displayed, as will hereinafter be described in detail.

Figure 7:
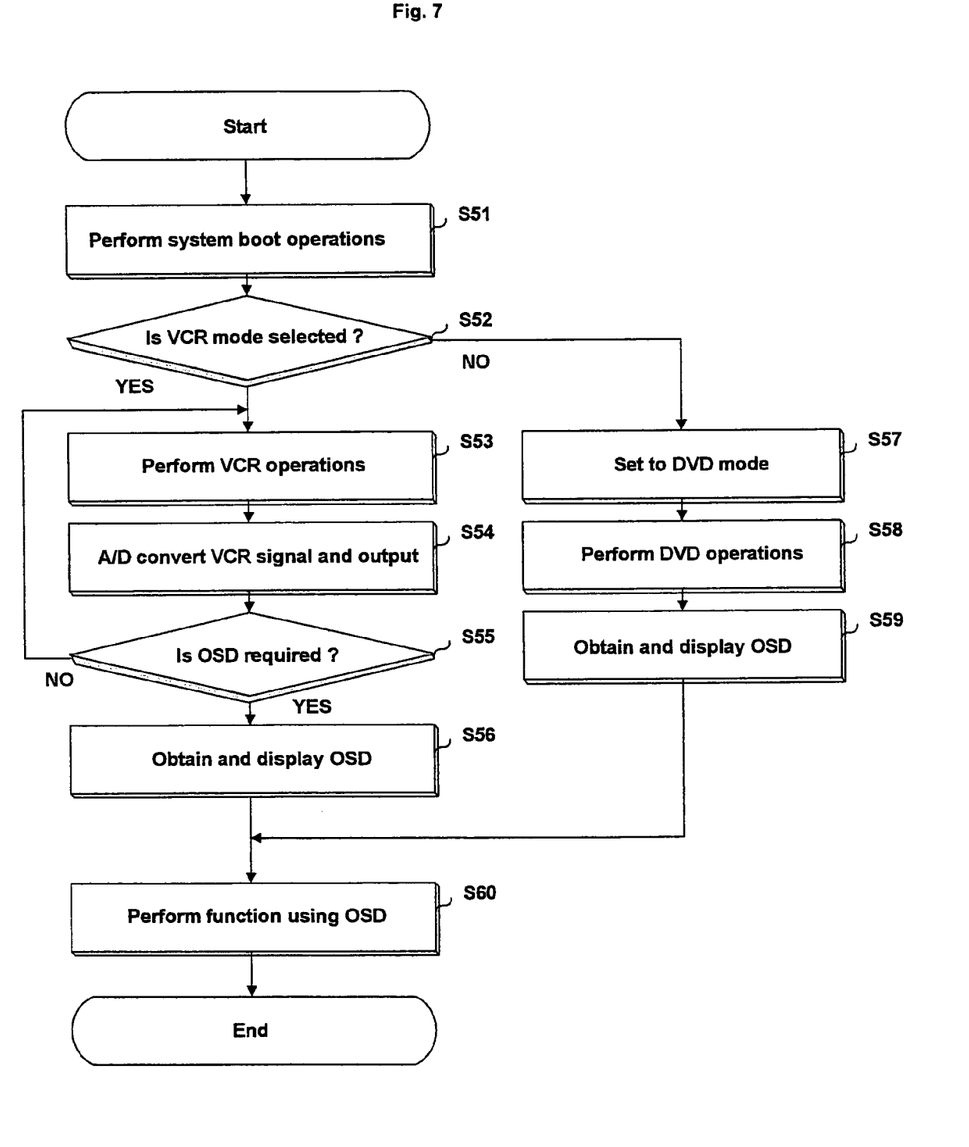
FIG. 7 is a flow chart illustrating another OSD image display method according to the present invention.

FIG. 7 is a flow chart illustrating the OSD image display method according to the second embodiment of the present invention. First, if the user turns on system power of the compound video device, then the first microcomputer 12 performs a system booting operation for control of the respective components corresponding to the VCR part and the second microcomputer 22 performs a system booting operation for control of the respective components corresponding to the DVD player part (S51).

Thereafter, the first microcomputer 12 sets the current operation mode of the compound video device to the VCR operation mode in response to a key input from the user, or transfers the key input to the second microcomputer 22 so that the microcomputer 22 can set the current operation mode to the DVD player operation mode. For example, in the case where the current operation mode of the compound video device is set to the VCR operation mode (S52), the first microcomputer 12 controls the VCR system 11 in response to the user's request to drive the tape mechanism 10.

Subsequently, the first microcomputer 12 performs a reproduction operation of reading/reproducing video and audio signals from a video tape (not shown) loaded in the tape mechanism 10, or a recording operation of recording video and audio signals on the video tape (S53). At this time, the DVD system 23 A/D-converts an analog signal reproduced by the VCR system 11, performs the digital signal process for the A/D-converted signal in the same manner as that for a DVD image and then outputs the resulting digital signal to an external connection device (S54).

Meanwhile, upon receiving a VCR OSD image display request from the user (S55), the first microcomputer 12 performs an interface with the second microcomputer 22, which then selects and reads an OSD graphic image for the VCR corresponding to a VCR OSD image requested by the user from the flash memory 24. Then, the DVD system 23 outputs the OSD graphic image for the VCR selected and read in the above manner and the reproduced VCR signal subjected to the same digital signal process as that for the DVD image, in an overlapped manner, or in such a manner that the OSD graphic image for the VCR overlaps the reproduced VCR signal (S56).

In other words, the reproduced analog VCR signal from the VCR system 11 is subjected to the same digital signal process as that for the DVD image by the DVD system 23, thereby enabling the OSD graphic image for the VCR to be normally displayed while overlapping the reproduced VCR signal.

On the other hand, provided that the current operation mode of the compound video device is set to the DVD player operation mode in response to the user's key input (S57), the second microcomputer 22 controls the DVD system 23 to perform a DVD reproduction operation of reading/reproducing video and audio data recorded on an optical disc, for example, a DVD loaded in the optical disk portion 20 (S58).

For output/display of an OSD image necessary for the DVD reproduction operation, the second microcomputer 22 reads an associated one of the OSD graphic images for the DVD separately stored in Area 1 of the flash memory 24, outputs the read OSD graphic image to the DVD system 23 and controls the DVD system 23 to perform a series of operations of outputting/displaying the OSD image necessary for the reproduction operation in the DVD player part (S59).

Thereafter, when the user selects and requests a desired operation or function using the OSD image for the VCR or the OSD image for the DVD outputted/displayed in the above manner, the first microcomputer 12 and the second microcomputer 22 perform the corresponding operation or function through an interface therebetween (S60).

For reference, a different type of nonvolatile memory capable of updating/storing data may be used instead of the flash memory 24. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the present invention provides an apparatus and method for displaying an OSD image in a compound video device, which can significantly simplify the construction of the compound video device. New OSD font data for a first video device and new OSD graphic images for a second video device, or new OSD graphic images for the first and second video devices can be updated/stored in a flash memory, or be simply replaced for existing ones.

As mentioned above, in alternate embodiments of the invention, the DVD system may include only a DVD player, or both a DVD player and a DVD recorder. This, the foregoing description and the following claims should not be limited to just devices having one type of DVD system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for displaying an on-screen display (OSD) image in a compound video device, the compound video device including first and second video devices of different types, the method comprising:
   a) separately storing a first type of OSD data for the first type of video device and a second type of OSD data for the second type of video device in one memory device; and
   b) selecting and reading any one of the first type of OSD data and the second type of OSD data stored in said memory in a corresponding operation mode of said first video device or an operation mode of said second video device to output an OSD image,
      wherein a first microcomputer is connected to the first type of video device and a second microcomputer is connected to the second type of video device, and when the device is operating in the first video device operation mode, said step b) includes:
         selecting and reading said first type of OSD data separately stored in said memory using the second microcomputer connected with the second type of video device; and
         communicating the first type of OSD data from the second microcomputer to the first microcomputer connected with the first type of video device.

2. The method as set forth in claim 1, wherein said step a) includes separately storing the first type of OSD data and the second type of OSD data in one flash memory device.

3. The method as set forth in claim 1, wherein when the device is operating in the second video device operating mode, said step b) includes selecting and reading said second type of OSD data separately stored in said memory to output/display said OSD image.

4. The method as set forth in claim 1, wherein said first video device is a video cassette recorder (VCR) and said second video device is a digital versatile disc (DVD) player.

5. The method as set forth in claim 1, wherein the step a) comprises:
   storing text used for menu items of an OSD for the first type of video device in a first portion of the memory; and
   storing image data used in an OSD for the second type of video device in a second portion of the memory.

6. The method as set forth in claim 1, further comprising the steps of converting an analog signal from said first video device into a digital signal with said second video device.

7. The method as set forth in claim 6, further comprising overlapping OSD graphic image corresponding to said first video device selected and read from said memory with the converted digital signal to generate a display signal.

8. The method as set forth in claim 1, wherein the step a) comprises:
   storing image data used for an OSD for the first type of video device in a first portion of the memory; and
   storing image data used for an OSD for the second type of video device in a second portion of the memory.

9. An apparatus for displaying an on-screen display (OSD) image in a compound video device, the compound video device including first and second video devices of different types, the apparatus comprising:
   a single memory device having stored therein both a first type of OSD data used by the first video device and a second type of OSD data used by the second video device;
   a first signal processor of the first video device configured to output an analog image signal; and
   a second signal processor of the second video device configured to output a digital image signal, wherein the second signal processor is also configured overlap the first type of OSD data read from the memory with an image signal from the first video device to produce an output image signal.

10. The apparatus as set forth in claim 9, wherein the second signal processor is also configured to convert the analog image signal produced by the first signal processor into a digital image signal.

11. The apparatus as set forth in claim 9, wherein said memory is a flash memory configured to separately store said first type of OSD data and said second type of OSD data.

12. The apparatus as set forth in claim 9, wherein both the first type of OSD data and the second type of OSD data comprises image data.

13. The apparatus as set forth in claim 9, wherein said first video device is a recorder and said second video device is a digital versatile disc (DVD) player.

14. The method of claim 13, wherein the recorder is a video cassette recorder (VCR), and the DVD player is a DVD player and recorder.

15. A method for displaying an on-screen display (OSD) image in a compound video device, the compound video device including first and second video devices of different types, the method comprising the steps of:
- separately storing first OSD image data for the first type of video device and second OSD image data for the second type of video device in one memory device;
- overlapping an image signal from the first type of video device with the first OSD image data using a signal processor of the second video device to produce an output image signal.

16. The method as set forth in claim 15, wherein the first video device outputs an analog image signal, and further comprising converting the analog image signal from the first video device into a digital image signal using the signal processor of the second video device.

17. The method as set forth in claim 16, wherein the signal processor of the second video device overlaps the first OSD image data with the converted digital image signal to produce the output image signal.

18. An apparatus for displaying an on-screen display (OSD) image in a video reproduction device having both a video cassette recorder (VCR) device and a digital video disc (DVD) device, the apparatus comprising:

- a memory to store a first OSD data for the VCR device in a first area of the memory and to store a second OSD data for the DVD device in a second area of the memory;
- the VCR device having a VCR system circuitry and a first processor to control the VCR system circuitry, the VCR device configured to output an analog signal; and
- the DVD device having a DVD system circuitry and a second processor to control the DVD system circuitry, the DVD device is configured to convert the analog signal from the VCR device to a digital signal, and the DVD device is configured to output the converted digital signal and the first OSD data.

19. The apparatus of claim 18, wherein the DVD system circuitry includes an analog to digital converter to convert the analog signal to the digital signal.

20. The apparatus of claim 18, wherein the DVD device is a DVD recorder.

21. The apparatus of claim 20, wherein the DVD device is also a DVD player.

* * * * *